United States Patent [19]
Ohnuma et al.

[11] 4,043,223
[45] Aug. 23, 1977

[54] OVERDRIVE MECHANISM FOR AUTOMATIC POWER TRANSMISSION

[75] Inventors: Kiyoshi Ohnuma; Syuzi Nagano, both of Toyota, Japan

[73] Assignee: Toyota Jidosha Kogyo Kabushiki Kaisha, Toyota, Japan

[21] Appl. No.: 666,423

[22] Filed: Mar. 12, 1976

[30] Foreign Application Priority Data

Mar. 25, 1975 Japan .................................. 50-34912

[51] Int. Cl.² ...................... F16H 47/08; F16N 57/10
[52] U.S. Cl. .................... 74/688; 74/781 R; 74/740
[58] Field of Search ................ 74/781 R, 740, 688, 74/718

[56] References Cited

U.S. PATENT DOCUMENTS

| | | | |
|---|---|---|---|
| 2,912,884 | 11/1959 | Christenson et al. | 74/740 X |
| 3,237,476 | 3/1966 | Jandasek | 74/781 R X |
| 3,444,761 | 5/1969 | Wickman | 74/740 |
| 3,473,411 | 10/1969 | Paredes | 74/781 R X |
| 3,578,117 | 5/1971 | Ahlen | 74/740 X |
| 3,941,013 | 3/1976 | Miller | 74/740 |
| 3,982,617 | 9/1976 | Worner | 192/106.2 |

FOREIGN PATENT DOCUMENTS

908,911  10/1962  United Kingdom .................. 74/740

*Primary Examiner*—Samuel Scott
*Assistant Examiner*—Lance W. Chandler
*Attorney, Agent, or Firm*—Finnegan, Henderson, Farabow & Garrett

[57] ABSTRACT

An overdrive mechanism disposed between a torque converter and change gear mechanism of an automatic transmission and responsive to the change gear mechanism. An input shaft to the change gear mechanism consists of two sections that are coupled by a clutch during normal power transmission. The driving section of the input shaft is connected to the turbine runner of the torque converter. A planetary gear train has a carrier operatively responsive to the pump impeller of the torque converter and a sun gear controlled by an overdrive brake. When the brake locks the sun gear against rotation during overdrive, the ring gear of the planetary gear train is rotated by the pump impeller and drives the second section of the input shaft through the clutch. The clutch is disengaged from the driving section of the input shaft during overdrive, thus by-passing power transmission from the turbine runner of the torque converter to the changer gear mechanism.

8 Claims, 4 Drawing Figures

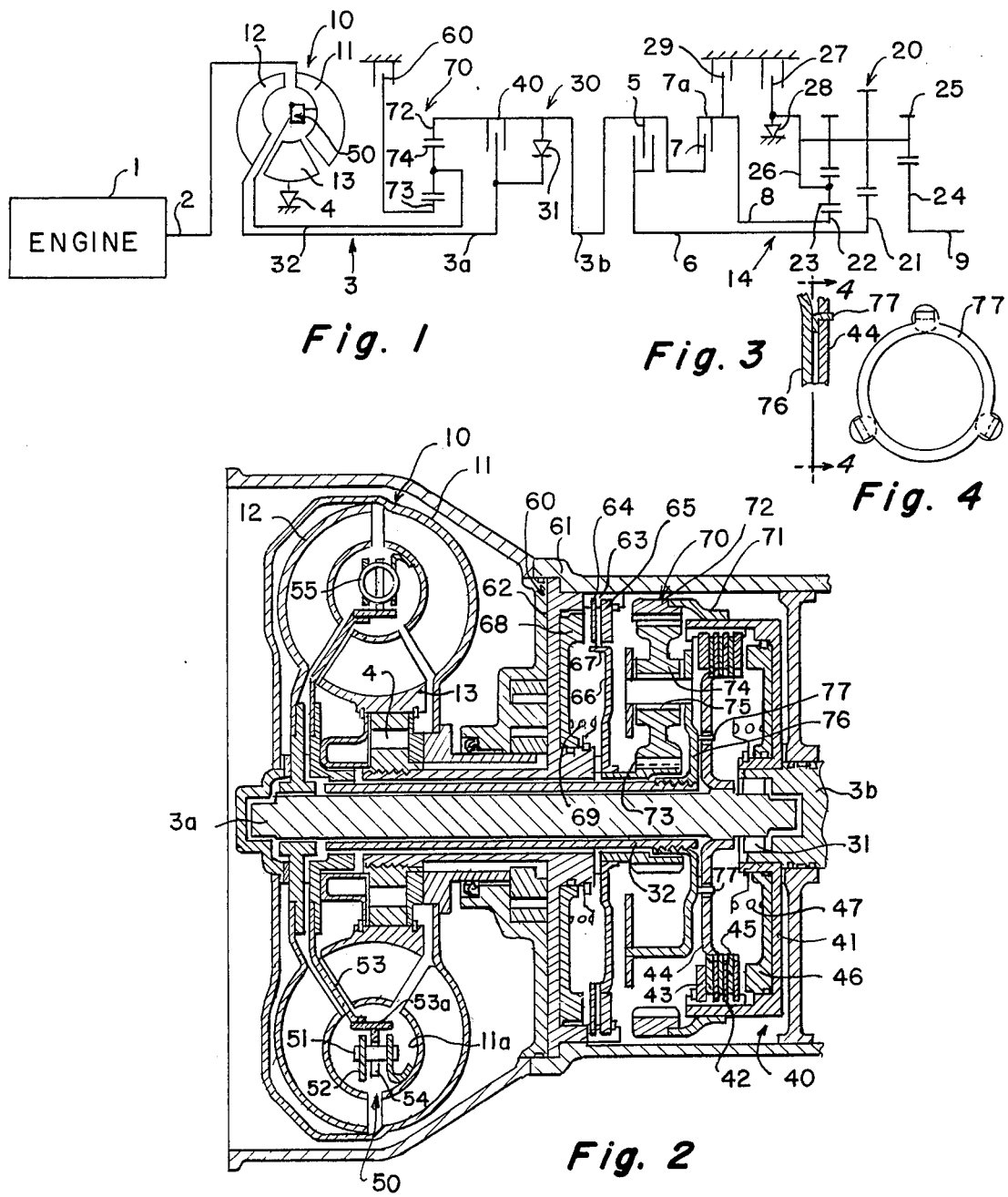

OVERDRIVE MECHANISM FOR AUTOMATIC POWER TRANSMISSION

BACKGROUND OF THE INVENTION

This invention relates to an overdrive mechanism for use in an automatic power transmission of an automotive vehicle.

More particularly, this invention relates to an overdrive mechanism for an automatic power transmission of the type incorporating a hydraulic torque converter disposed between an engine and a change gear mechanism.

The conventional torque converter of an automatic power transmission varies the turning force automatically and in a smooth and stepless fashion in accordance with the resistance of the vehicle. However, the conventional torque converter is severely limited in a practical sense and in efficiency because of considerably energy loss arising inevitably from fluid friction during the passage of fluid through the torque converter or from turbulence caused by a drastic change in the direction of flow of the fluid. Even when a conventional overdrive device is employed in this type of automatic transmission, no satisfactory improvement in fuel efficiency can be attained because the engine power continues to be transmitted automatically through the torque converter at the time of overdrive.

Accordingly, it is a primary object of this invention to provide a new and improved overdrive mechanism which eliminates the above-described problems of the automatic power transmission having a torque converter.

Another object of this invention is to minimize the fluctuations in the rotational force by the torque converter when not required. This usually occurs during a constant high speed operation of the engine for a long period such as in overdrive.

It is a further object of this invention to provide an overdrive mechanism which mechanically transmits the engine power to the change gear mechanism with an improved fuel efficiency by not passing through the torque converter at the time of overdrive.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the overdrive mechanism of this invention is for automatic transmissions of the type including a change gear mechanism and a torque converter having an input element connected to an engine and an output element operatively connected to the change gear mechanism, and comprises: (1) an input shaft to the change gear mechansim having a first section connected to the output element of the torque converter and a second section connected to the change gear mechanism; (2) clutch means operatively connected to the second section of the input shaft and engaging the first section of the input shaft, the clutch means being disengaged from the first section in response to a predetermined operation of the change gear mechanism; (3) a planetary gear train including (a) a sun gear, (b) a carrier operatively responsive to the input element of said torque converter, and (c) a ring gear operatively connected to the clutch means; and (4) overdrive brake means activated in response to the predetermined operation of the change gear mechanism for locking the sun gear against rotation whereby the ring gear is rotated by movement of the carrier in response to movement of the input element of the torque converter.

It is preferred that the overdrive mechanism further include a one-way clutch parallel to the clutch means for connecting the first section of the input shaft to the second section of the input shaft, the one-way clutch decoupling the second section from the first section when the speed of the second section exceeds that of the first section.

The invention consists in the novel parts, construction, arrangements, combinations and improvements shown and described. The accompanying drawing, which is incorporated in and constitutes a part of this specification, illustrates an embodiment of the invention and, together with the description, serves to explain the principles of the invention.

BRIEF DESCRIPTION OF THE DRAWING

Of the drawing:

FIG. 1 is a schematic diagram illustrating an embodiment of an automatic power transmission employing the teachings of this invention;

FIG. 2 is a sectional view showing the overdrive mechanism of this invention;

FIG. 3 is an enlarged fragmented view of that portion of the automatic power transmission of FIG. 2 showing interaction of elements 44, 76 and 77; and FIG. 4 is a sectional view taken along 4—4 of FIG. 3.

DETAILED DESCRIPTION OF THE DRAWING

Reference will now be made in detail to the present preferred embodiment of the invention, an example of which is illustrated in the accompanying drawing.

Referring now to FIG. 1, an automatic power transmission, as well known in the art, is schematically shown. A crank shaft 2 of the engine 1 is connected to a pump impeller 11 of a hydraulic torque converter 10. A turbine runner 12 of torque converter 10 is operatively connected to an input shaft 3 of a change gear mechanism 14. A stator 13 is interposed between pump impeller 11 and turbine runner 12, and supported by a one-way clutch 4 so as to rotate only in one direction. The input shaft 3 is further connected through a front clutch 5 to an intermediate shaft 6 and through a rear clutch 7 to another intermediate shaft 8. Between intermediate shafts 6 and 8, and an output shaft 9, is disposed a planetary gear unit 20.

This planetary gear unit 20 consists of first and second sun gears 21 and 22 which are respectively mounted on intermediate shafts 6 and 8. A short pinion 23 engages with second sun gear 22, and a long pinion 25 engages with short pinion 23, first sun gear 21 and a gear 24 of output shaft 9. A carrier 26 rotatably supports short and long pinions 23 and 25.

A combined first and reverse brake 27 and a one-way clutch 28 are mounted on carrier 26. A second brake 29 is mounted on a rear clutch drum 7a and is made integral with second sun gear 22. The construction of the above-described change gear mechanism is more fully disclosed in U.S. Pat. No. 3,714,847, assigned to the same firm as is this application.

In accordance with the present invention, an overdrive mechanism 30 is provided in the automatic power transmission of the above-described type between torque converter 10 and change gear mechanism 14.

As herein embodied, and as best seen in FIG. 2, input shaft 3 is divided into two sections in which the first section 3a is connected to turbine runner 12 and the second section 3b is connected to change gear mechanism 14. Between sections 3a and 3b is located clutch means 40. Preferably, clutch means 40 comprises the same construction as those of the aforementioned clutches 5 and 7. A hub 44 is attached to first section 3a of input shaft 3. A disc 45 of hub 44 is positioned between a plate 42 and a flange 43 that are secured to a drum 41. Drum 41 in turn is operatively connected to second section 3b of input shaft 3. When a piston 46, located within drum 41, is hydraulically actuated in response to a predetermined operation of change gear mechanism 14 against the force of a return spring 47, plate 42 and flange 43 engage disc 45 to provide an integral coupling between first section 3a and second section 3b of input shaft 3. It is preferred that a one-way clutch 31 be located parallel to clutch means 40 between first section 3a and second section 3b in such a fashion that it effects engaging action between first section 3a and second section 3b only when first section 3a is operating at a speed equal to or higher than second section 3b.

In accordance with the invention, an internal surface 11a of the casing of pump impeller 11 is connected mechanically through a torsional damper 50 to an intermediate shaft 32 which is disposed coaxially outside of first section 3a of input shaft 3. Between intermediate shaft 32 and second section 3b is positioned a single planetary gear train 70 for use in connection with overdrive.

Preferably, torsional damper 50 comprises a connection plate 52 attached to internal surface 11a of the casing of pump impeller 11. Connection plate 52 has a number of teeth 51 defined on the periphery thereof. A flange 53 extends from the vicinity of connection plate 52 through the spacing between turbine runner 12 and stator 13, and is then connected to intermediate shaft 32. Engaging means such as plate 54 is mounted onto the outer peripheral section 53a of flange 53 and engages integrally with teeth 51 in a direction of rotation. A torsion spring 55 is interposed between teeth 51 and engaging means 54 so as to mitigate the shock at the time of power transmission. As can be seen from this assembly, torsional damper 50 functions to mechanically transmit the power from pump impeller 11 to intermediate shaft 32.

Preferably, single planetary gear train 70 comprises a ring gear 72 connected by a connecting member 71 to drum 41 of clutch 40, a sun gear 73, a pinion 74 which engages both ring gear 72 and sun gear 73, and a carrier 76 which is operatively connected to intermediate shaft 32 and supports rotatably pinion 74 through a needle roller 75. It is also preferred, as seen in FIGS. 2-4, that a thrust washer 77 be provided between hub 44 and carrier 76. Thrust washer 77 has claws which engage in a corresponding aperture in hub 44. The washer under a thrust is in sliding contact with carrier 76 in a circumferential direction.

In accordance with the invention, there is provided overdrive brake means 60 activated in response to the predetermined operation of change gear mechanism 14 for locking sun gear 73 against rotation. Preferably, overdrive brake means 60 comprises the same construction as those of the forementioned brakes 27 and 29. A hub 66 carries a sun ger 73. A disc 67 mounted on hub 66 is positioned between a plate 64 and a flange 65 which are secured to a drum 63. Drum 63 is mounted on a member 62 which is integrally coupled to the side of transmission casing 61. When a piston 68, located within drum 63, is hydraulically actuated against the force of return spring 69, in response to the predetermined operation of change gear mechanism 14, plate 64 and flange 65 engage disc 67 to lock sun gear 73 against rotation. With this arrangement, single planetary gear train 70 is operable to turn ring gear 72 with greater rotational speed than that of the engine provided through carrier 76.

When the vehicle is being run by engine power, the power of crank shaft 2 of the engine is transmitted hydraulically from pump impeller 11 of torque converter 10 to turbine runner 12. Turbine runner 12 in turn provides an input to first section 3a of input shaft 3. Simultaneously, the power of pump impeller 11 of torque converter 10 is applied to carrier 76 of single planetary gear train 70 through torsional damper 50 and intermediate shaft 32. Since overdrive brake means 60 is not actuated during this time, it is not in a locking position with sun gear 73. Therefore, planetary gear train 70 remains idle without effecting any action or establishing an increased rotation at ring gear 72.

During this normal operation of the automatic power transmission, clutch means 40 is actuated to provide integral coupling between first section 3a and second section 3b of input shaft 3. Furthermore, since first section 3a is operating at a speed equal to or higher than second section 3b at this time, the drive power of section 3a from torque runner 12 is transmitted to section 3b through one-way clutch 31 as well as clutch means 40. The drive power thus transmitted to section 3b is further input as such to the drum side of front clutch 5 and the hub side of rear clutch 7. This power is further transmitted to first sun gear 21 of planetary gear unit 20 through intermediate shaft 6 my means of the engaging action of front clutch 5. If carrier 26 is locked by the action of one-way clutch 28 or the combined first and reverse brake 27, output shaft 9 is furninshed with the output of the first or low speed running condition of a maximum gear ratio. Likewise, if second sun gear 22 is locked by the action of second brake 29, output shaft 9 is furnished with the second speed running condition of a gear ratio that is smaller than that of the first speed. Further, if the engine power is also input to second sun gear 22 through intermediate shaft 8 by engaging action of front clutch 5, the planetary gear unit 20 is integrated so that a high speed rotation of section 3b is transmitted as such to output shaft 9. In this event, a shift to the third speed running condition occurs.

However, when the power of section 3b is input to second sun gear 22 by engaging action of rear clutch 7, and carrier 26 is locked by the action of the combined first and reverse brake 27, output shaft 9 is supplied with a reversed speed running condition.

Three forward and one reverse speeds are possible by selective activation of clutches 5 and 7, brakes 27 and 29, and one-way clutch 28. When, under the third speed condition, input and output shafts 3 and 9 are connected directly with each other by the selective action of the two clutches 5 and 7, clutch means 40 is released and overdrive brake means 60 is actuated to lock sun gear 73 against rotation. Sun gear 73 up to now has been rotating in single planetary gear train 70 in idling condition. By this engagement, ring gear 72 of single planetary gear train 70 is caused to rotate by action with pinion 75 and carrier 76 at a larger number of revolutions than that of the engine which power is being supplied to carrier 76 at a lower speed. The higher rotational speed of ring gear 72 is transmitted to second section 3b of input shaft 3 by way of connecting member 71 and drum 41 of clutch 40 so that second section 3b is likewise caused to rotate with a larger number of revolutions than that of the engine.

One-way clutch 31 also disengages first section 3a from section 3b as clutch means 40 is released and as section 3b of shaft 3 comes to a higher speed than section 3a. Engine power transmitted hydraulically through a fluid from pump impeller 11 of torque converter 10 to turbine runner 12 and first section 3a is thus not transmitted to section section 3b. Instead, the engine power is now transmitted mechanically from pump impeller 11 to intermediate shaft 32, and into planetary gear train 70. Since the higher rotational speed of ring gear 72 is taken up at the second section 3b, the power is subsequently transmitted directly to output shaft 9 through clutches 5 and 7, planetary gear unit 20, and the like, to establish the overdrive condition.

When the vehicle is wheel-driven during any of the normal running conditions previously mentioned, except overdrive, one-way clutch 31 is not engaging first section 3a to second section 3b of input shaft 3 but transmission of power is occurring from second section 3b of input shaft 3 through clutch means 40 alone to first section 3a.

As shown in this preferred embodiment of the invention, transmission of power is possible without passing through torque converter 10 at the time of overdrive. Accordingly, the poor performance of a torque converter is signficantly minimized during an overdrive condition, and fuel efficiency is greatly improved. At the same time, the effect of multiplying the engine rotational speed to the change gear mechanism is accomplished.

In accordance with the present invention, transmission of power is quickly and easily changeable by mere manipulation of overdrive brake means 60 and clutch means 40 from the ordinary transmission through torque converter 10 to a mechanical transmission bypassing torque converter 10. The overdrive mechanism eliminates the use of a turning element effecting a relative rotation inside the torque converter 10 so as to prevent loss of energy due to agitation of the fluid by such a turning element. This further ensures a highly efficient working condition of torque converter 10.

In accordance with the present invention, overdrive mechanism 30 can be applied to a change gear mechanism other than the one described in this preferred embodiment. Additionally, the positioning of torsional damper 40 need not be limited specifically to that illustrated in this preferred embodiment. It should be further noted that clutch means 40 can be maintained at a low level capacity because one-way clutch 31, having a function similar to that of clutch means 40, is arranged parallel to clutch means 40.

It will be apparent to those skilled in the art that various modifications and variations could be made in the overdrive mechanism without departing from the scope or spirit of the invention.

What is claimed is:

1. An overdrive mechanism for automatic transmissions of the type including a change gear mechanism and a torque converter having an input element connected to an engine and an output element operatively connected to said change gear mechanism, said overdrive mechanism comprising:

an input shaft to said change gear mechanism having a first section connected to said output element of said torque converter and a separate second section connected to said change gear mechanism;

clutch means operatively connected to said second section of the input shaft and engaging said first section of the input shaft, said clutch means being disengaged from said first section in response to a predetermined operation of the change gear mechanism;

a planetary gear train including (i) a sun gear, (ii) a carrier operatively responsive to the input element of said torque converter, and (iii) a ring gear operatively connected to said clutch means; and overdrive brake means activated in response to said predetermined operation of the change gear mechanism for locking said sun gear against rotation whereby said ring gear is rotated by movement of said carrier in response to movement of said input element of said torque converter, said second section of said input shaft, said clutch means, said planetary gear train and said overdrive brake means all being positioned outside said torque converter.

2. An overdrive mechanism of claim 1 further including a one-way clutch parallel to said clutch means for connecting said first section of the input shaft to said second section of the input shaft, said one-way clutch decoupling said second section from said first section when the speed of said second section exceeds that of said first section.

3. The overdrive mechanism of claim 1 wherein said input element of said torque converter is a pump impeller, and said output element of said torque converter is a turbine runner; said torque converter further comprising a stator located between said pump impeller and said turbine runner, and said overdrive mechanism including means for mechanically connecting said pump impeller to said carrier.

4. The overdrive mechanism of claim 1 wherein said planetary gear train further includes a pinion rotatably supported by said carrier and engaging said ring gear and said sun gear.

5. The overdrive mechanism of claim 3 wherein said mechanically connecting means includes (a) an intermediate shaft disposed co-axially with said first section of the input shaft and having said carrier attached thereto, and (b) a torsional damper, said damper comprising (i) a connection plate formed upon the internal surface of said pump impeller, said plate having teeth on the periphery thereof, (ii) a flange connected to said intermediate shaft, (iii) means mounted on the periphery of said flange for engaging the teeth of said connection plate, and (iv) a torsion spring interposed between said teeth and said engaging means so as to mitigate shock during power transmission.

6. The overdrive mechanism of claim 1 wherein said overdrive brake means includes a brake having a drum, a plate secured to said drum, a piston within said drum for hydraulic operation in response to actuation by the change gear mechanism, and a flange secured to said drum; and said overdrive mechanism further including a hub for carrying said sun gear, said hub having a disc mounted thereon and positioned between said plate and flange of said drum so that when said piston is actuated the plate and flange engage said disc to lock said sun gear against rotation.

7. The overdrive mechanism of claim 1 wherein said clutch means includes a clutch having a drum operatively connected to said second section of the input shaft, a plate secured to said drum, a piston within said drum for hydraulic operation in response to actuation by the change gear mechanism, and a flange secured to said drum; and said overdrive mechansim further including a hub attached to said first section of the input shaft, said hub having a disc mounted thereon and positioned between said plate and said flange of said drum so that when said piston is actuated the plate and flange engage said disc to thereby engage said first section with said clutch.

8. The overdrive mechanism of claim 7 wherein a connecting member attaches said ring gear to said drum of said clutch.

* * * * *